United States Patent
Shimizu et al.

(10) Patent No.: US 11,941,815 B2
(45) Date of Patent: Mar. 26, 2024

(54) METHOD AND A SYSTEM TRAINING A MODEL TO PERFORM SEMANTIC SEGMENTATION ON FOGGY IMAGES

(71) Applicants: TOYOTA MOTOR EUROPE, Brussels (BE); ETH ZURICH, Zurich (CH)

(72) Inventors: Hiroaki Shimizu, Brussels (BE); Dengxin Dai, Zurich (CH); Christos Sakaridis, Zurich (CH); Luc Van Gool, Zurich (CH)

(73) Assignees: TOYOTA MOTOR EUROPE, Brussels (BE); ETH ZURICH, Zurich (CH)

( * ) Notice: Subject to any disclaimer, the term of this patent is extended or adjusted under 35 U.S.C. 154(b) by 576 days.

(21) Appl. No.: 17/258,519

(22) PCT Filed: Jul. 24, 2018

(86) PCT No.: PCT/EP2018/070074
§ 371 (c)(1),
(2) Date: Jan. 7, 2021

(87) PCT Pub. No.: WO2020/020446
PCT Pub. Date: Jan. 30, 2020

(65) Prior Publication Data
US 2021/0158098 A1    May 27, 2021

(51) Int. Cl.
*G06K 9/00*        (2022.01)
*G06F 18/214*      (2023.01)
(Continued)

(52) U.S. Cl.
CPC ............ *G06T 7/11* (2017.01); *G06F 18/2148* (2023.01); *G06N 3/08* (2013.01); *G06V 10/44* (2022.01);
(Continued)

(58) Field of Classification Search
CPC ..... G06T 7/10–194; G06T 2207/20021; G06T 2207/20112–20168; G06T 5/50;
(Continued)

(56) References Cited

U.S. PATENT DOCUMENTS

| 2017/0243083 | A1* | 8/2017 | Wang | G06T 7/20 |
| 2018/0268255 | A1* | 9/2018 | Surazhsky | G06N 3/045 |
| 2019/0377981 | A1* | 12/2019 | Veeravasarapu | G06T 15/20 |

OTHER PUBLICATIONS

Christos Sakaridis et al., "Semantic Foggy Scene Understanding with Synthetic Data", International Journal of Computer Vision, Mar. 23, 2018, pp. 973-992, vol. 126, No. 9.
(Continued)

*Primary Examiner* — Atiba O Fitzpatrick
(74) *Attorney, Agent, or Firm* — Sughrue Mion, PLLC

(57) ABSTRACT

A system and a method for training a model to be used for semantic segmentation of images, comprising:
a—obtaining (S01) a first plurality of foggy images (101),
b—training (S02) a classification model for estimating fog density,
c—classifying (S03) a second plurality of images (101) having light fog,
d—obtaining (S04) a third plurality of foggy images (103) having light fog,
e—training (S05) a semantic segmentation model using the third plurality of foggy images,
f—applying (S06) the semantic segmentation model to the second plurality of foggy (102) images to obtain semantic segmentations (102'),
g—obtaining (S07) a fourth plurality of foggy images (104) having dense fog,
h—training (S08) using the previously obtained foggy images.

12 Claims, 2 Drawing Sheets

(51) Int. Cl.
*G06N 3/08* (2023.01)
*G06T 7/11* (2017.01)
*G06V 10/44* (2022.01)
*G06V 10/776* (2022.01)
*G06V 20/10* (2022.01)
*G06V 20/56* (2022.01)
*G06V 20/58* (2022.01)
*G06V 20/70* (2022.01)

(52) U.S. Cl.
CPC ............ *G06V 10/776* (2022.01); *G06V 20/10* (2022.01); *G06V 20/56* (2022.01); *G06V 20/58* (2022.01); *G06V 20/70* (2022.01); *G06T 2207/10004* (2013.01); *G06T 2207/20081* (2013.01); *G06T 2207/20084* (2013.01)

(58) Field of Classification Search
CPC ................ G06T 2207/30252–30252; G06T 2207/30236; G06T 2207/20081; G06T 2207/20084; A61B 5/7485; G06V 10/25–273; G06V 40/162; G06V 20/698; G06V 20/00–588; G06V 10/774–7796; G06K 9/6224; G06K 9/6256; G06K 9/6257; G06K 9/6259; G06N 3/08–0985; G06N 3/02–126; G06N 20/00–20; G06F 18/214–2155; G06F 7/023; G06F 40/16
See application file for complete search history.

(56) References Cited

OTHER PUBLICATIONS

Yoshua Bengio et al., "Curriculum Learning", Proceedings of the 26th Annual International Conference on Machine Learning, ICML, Jun. 14, 2009, pp. 41-48.

Yang Zhang et al., "Curriculum Domain Adaptation for Semantic Segmentation of Urban Scenes", 2017 IEEE International Conference on Computer Vision, Oct. 22, 2017, pp. 2039-2049.

Written Opinion for PCT/EP2018/070074, dated Dec. 17, 2018.

International Search Report for PCT/EP2018/070074, dated Dec. 17, 2018.

* cited by examiner

METHOD AND A SYSTEM TRAINING A MODEL TO PERFORM SEMANTIC SEGMENTATION ON FOGGY IMAGES

CROSS REFERENCE TO RELATED APPLICATIONS

This application is a National Stage of International Application No. PCT/EP2018/070074 filed Jul. 24, 2018.

FIELD OF THE INVENTION

The present invention relates to the field of image processing, and more precisely to the semantic segmentation of images in which fog may appear.

DESCRIPTION OF THE RELATED ART

Semantic segmentation is a method for determining the types of objects which are visible (or partially visible) in an image. For example, the image may be acquired by a camera mounted in a vehicle. Semantic segmentation of such an image allows distinguishing other cars, pedestrians, traffic lanes, etc. Therefore, semantic segmentation is particularly useful for self-driving vehicles and for other types of automated systems.

Semantic segmentation methods typically use models such as neural networks or convolutional neural network to perform the segmentation. These models have to be trained.

Training a model typically comprises inputting known images to the model. For these images, a predetermined semantic segmentation is already known (an operator may have prepared the predetermined semantic segmentations of each image by annotating the images). The output of the model is then evaluated in view of the predetermined semantic segmentation, and the parameters of the model are adjusted if the output of the model differs from the predetermined semantic segmentation of an image.

It follows that in order to train a semantic segmentation model, a large number of images and predetermined semantic segmentations are necessary.

Is has been observed that adverse weather conditions create visibility problems for drivers and for automated systems. While sensors and computer vision algorithms are constantly getting better, these often fail to work in many outdoor conditions. This prevents these automated systems from actually being used: it is not conceivable for a vehicle to avoid bad weather, and the vehicle has to be able to distinguish different objects in every possible weather conditions.

Fog is a typical example of adverse weather which degrades the visibility of a scene significantly, according to the density of the fog.

It is thus desirable to train semantic segmentation models with foggy images (images on which fog appears).

However, obtaining semantic segmentation data on foggy images (for example foggy pictures taken by a camera) is particularly difficult and time-consuming, especially if an operator has to annotate the foggy images by hand before feeding the foggy images to the model.

It has been proposed to generate synthetic foggy images to overcome this problem.

In fact, obtaining a semantic segmentation is easier to perform on a clear image, and the semantic segmentation of a clear image can be used to train a model to which the image with synthetic fog has been inputted.

Prior art document "Semantic foggy scene understanding with synthetic data" (International Journal of Computer Vision, Sakaridis, C., Dai, D., Van Gool, L., 2018) discloses a method for adding synthetic fog on clear weather images. These images may then be used to train a neural network. The solution disclosed in this document is not satisfactory for the semantic segmentation of images which present dense fog.

It is a primary object of the invention to provide methods and system that overcome the deficiencies of the currently available systems and methods.

SUMMARY OF THE INVENTION

The present invention overcomes one or more deficiencies of the prior art by proposing a method for training a model to be used for semantic segmentation of images, comprising:
a—obtaining a first plurality of foggy images having different densities (for example a random fog density on each image) of synthetic fog,
b—training a classification model for estimating fog density using the first plurality of foggy images and the associated different densities,
c—classifying a second plurality of images using the classification model of step b according to the fog density in the images, so as to obtain a second plurality of foggy images each having a fog density comprised within a first fog density threshold and a second fog density threshold,
d—obtaining a third plurality of foggy images each having a fog density of synthetic fog comprised within the first fog density threshold and the second fog density threshold,
e—training a semantic segmentation model using the third plurality of foggy images and predefined semantic segmentations of the third plurality of images,
f—applying the semantic segmentation model of step e to the second plurality of foggy images to obtain semantic segmentations of the second plurality of foggy images,
g—obtaining a fourth plurality of foggy images each having a fog density of synthetic fog comprised within a third fog density threshold and a fourth fog density threshold, the third and fourth fog density thresholds being both greater than the first and second fog density thresholds,
h—training the semantic segmentation model of step e using:
the fourth plurality of foggy images and predefined semantic segmentations of the fourth plurality of foggy images,
the second plurality of foggy images and the semantic segmentations of the plurality of foggy images obtained in step f.

In the present application, a predefined semantic segmentation is a semantic segmentation which may have been obtained through an operator's annotation. Hence, when a predefined semantic segmentation is mentioned, it is implied that the corresponding (foggy) image can be used for training models or neural networks. Because an operator may have prepared the annotations leading to the semantic segmentation, it is possible that these annotations are of very good quality.

Hence, training a model in step e using predefined semantic segmentations may provide good training of the semantic segmentation model.

Because the third and fourth fog density thresholds are both greater than the first and second fog density thresholds, the first and second density thresholds may correspond to light fog or at least lighter fog than the fog of the third and fourth fog density thresholds which correspond to dense fog or at least denser fog.

The person skilled in the art may choose the fog density thresholds according to the application to differentiate light fog from dense fog.

It should be noted that obtaining an image having chosen fog density of synthetic fog may be performed according to the method disclosed in document Semantic foggy scene understanding with synthetic data" (International Journal of Computer Vision, Sakaridis, C., Dai, D., Van Gool, L., 2018). This method allows using a parameter to select the density of the fog: hence, training the model of step b can use the parameter used for adding synthetic fog.

The images of the second plurality of image do not contain synthetic fog, they may be images of scenes which may contain real fog. Using the trained model of step b, it is possible to select only the images which contain real light fog. Because the model of step e has been trained using predefined semantic segmentations of images having synthetic light fog, and because the second plurality of foggy images only contains images with light fog, the semantic segmentations obtained in step f are also of good quality.

It follows that the data inputted to the model in step h is of good quality and allows adapting the model to perform semantic segmentation on denser fog.

Also, it should be noted that synthetic fog, and especially dense synthetic fog, may contain artefacts. It is therefore interesting to temper the training in step h using real fog (the second plurality of foggy images).

According to a particular embodiment, step h comprises inputting, to the semantic segmentation model of step e, a mix of images from the second plurality of foggy images and of images from the fourth plurality of foggy images so as to obtain a stream of images to be fed to the model, wherein the stream of images comprises a greater proportion of images from the fourth plurality of foggy images than images from the second plurality of foggy images.

The inventors of the present invention have observed that because the predefined semantic segmentations of the fourth plurality of foggy images may be of good quality (for example because they may be obtained through an operator's annotation prior to performing the method), it is preferable to use a greater number of images from this plurality.

According to a particular embodiment, step h comprises minimizing the following value:

$$\frac{1}{l}\sum_{i=1}^{l} L(\phi''(x_i''), y_i) + \lambda \frac{1}{u} \sum_{j=l+1}^{l+u} L(\phi''(\bar{x}_j'), \bar{y}_j)$$

wherein:

l is the number of image in the fourth plurality of foggy images, $x_i''$ is an image of index i in the fourth plurality of foggy images, $y_i$ is the predefined semantic segmentation of image $x_i'$, L(x, y) is the cross entropy loss function of x and y, $\phi''(x_i'')$ is the output of the semantic segmentation model, u is the number of images in the second plurality of foggy images, $$\lambda = \frac{u}{l} \times w,$$

with w being a predefined weight, $\bar{x}_j'$ is an image of the second plurality of foggy images, and $\bar{y}_j$ is the semantic segmentation of image $x_i''$ obtained in step f.

In the above equations, the loss L(x, y) is calculated after each processing of an image and the parameters of the models are adjusted to minimize this loss.

By mixing the images from the fourth plurality of foggy images and from the second plurality of foggy images, in a proportion which may be of 1:w (the predefined weight, for example equal to ⅓), this training leads, in the end, to minimizing the above equation:

$$\frac{1}{l}\sum_{i=1}^{l} L(\phi''(x_i''), y_i) + \lambda \frac{1}{u} \sum_{j=l+1}^{l+u} L(\phi''(\bar{x}_j'), \bar{y}_j)$$

According to a particular embodiment, in steps a, d, and g, obtaining a foggy image for the first, third or fourth plurality of foggy images comprises:

obtaining a depth map of an initial image, obtaining a predefined semantic segmentation of the initial image, elaborating a transmittance map of the initial image, in which for each pixel of the initial image, the transmittance decreases when the depth of the pixel in the depth map increases, filtering the transmittance map by taking into account the predefined semantic segmentation of the image to obtain a filtered transmittance map, simulating the appearance of fog on the initial image using the filtered transmittance map to obtain the foggy image.

The inventors of the present invention have observed that by using the predefined semantic segmentation of the image, the transmittance map better reflects the transmittance of a real foggy image (obtained using a camera acquiring a picture of a foggy scene).

It should be noted that in the present application, a (filtered) transmittance map determines the amount of scene radiance which may reach the camera (the viewpoint of the image). Transmittance maps are notably disclosed in document "Semantic foggy scene understanding with synthetic data". The transmittance map may have the same resolution as the image: a pixel of the image has an associated transmittance value. Similarly, the depth map may also have the same resolution as the image.

The elaboration of the transmittance map in which the transmittance decreases when the depth increases provides a first approximation of fog. This first approximation is improved by the subsequent filtering step.

It should be noted that transmittance maps and radiance are terminologies which are known to the person skilled in the art and which are further described, by way of example, in documents "Single image haze removal using dark channel prior" (He, K., Sun, J., Tang, X., IEEE Transactions on Pattern Analysis and Machine Intelligence 33(12) (2011) 2341-2353) and "Bayesian defogging" (Nishino, K., Kratz, L., Lombardi, S., International Journal of Computer Vision 98(3) (2012) 263-278).

According to a particular embodiment filtering the transmittance map comprises applying a bilateral filter.

Thus, the initial transmittance of a pixel is de-noised and enhanced.

Bilateral filtering allows smoothing the transmittance while preserving the edges, and, in the present invention, the edges between separate semantic objects.

According to a particular embodiment the bilateral filter is defined as:

$$t(p) = \frac{\sum_{q \in N(p)} G_{\sigma_s}(\|q-p\|)[\delta(h(q)-h(p)) + \mu G_{\sigma_c}(\|J(q)-J(p)\|)]\hat{t}(q)}{\sum_{q \in N(p)} G_{\sigma_s}(\|q-p\|)[\delta(h(q)-h(p)) + \mu G_{\sigma_c}(\|J(q)-J(p)\|)]}$$

wherein:
p and q are pixels of the initial image,
N(p) is the neighborhood of p,
t(p) is the transmittance of pixel p in the filtered transmittance map,
$\hat{t}(q)$ is the transmittance of pixel q in the transmittance map,
$G_{\sigma_s}$ is a spatial Gaussian kernel,
$G_{\sigma_c}$ is a color-domain Gaussian kernel,
δ is the Kronecker delta,
μ is a predetermined weight,
h(p) and h(q) are respectively the semantic labels of pixels p and q, and
J(q) and J(p) are respectively the color value in the CIELAB domain.

The inventors of the present invention have observed that the above equation may be easily implemented thus facilitating implementation of the invention. More precisely, it is possible to use bilateral grids as disclosed in document "A fast approximation of the bilateral filter using a signal processing approach" (International Journal of Computer Vision, Paris, S., Durand, F., 2009).

By way of example, it is possible to generate two separate bilateral grids each corresponding to semantic and color domains and then to operate separately on each grid to perform filtering by combining the results in the end. Thus, a 3-dimensional grid (pixel position and label) for the semantic domain and a 5-dimensional (pixel position and three color components) are used instead of a single joint 6-dimensional grid which would increase computation time.

According to a particular embodiment, the transmittance map is defined as:

$$\hat{t}(q) = \exp(-\beta l(q))$$

with:
$\hat{t}(q)$ being the transmittance of pixel q in the transmittance map,
β is an attenuation coefficient, and
l(q) is the depth of pixel q in the depth map.

This transmittance map allows simulating homogeneous fog in a first approximation. The attenuation coefficient β may be chosen to reduce the visibility and increase the density of the fog according to the depth.

According to a particular embodiment, wherein simulating the appearance of fog on the initial image using the filtered transmittance map comprises calculating the color value I(x) of each pixel as:

$$I(x) = R(x) + L(1-t(x))$$

wherein:
x is a pixel position,
R(x) is the color value of the image,
L(1−t(x)) is the atmospheric light, and
t(x) is the transmittance of pixel x in the filtered transmittance map.

According to a particular embodiment, the depth map is obtained using a depth-by-stereo method and optionally an outlier suppression method.

The outlier suppression method may comprise a suppression of holes.

A depth-by-stereo method may comprise acquiring two images using two cameras which are separated horizontally by a distance.

The outlier suppression method may comprise a suppression of missing values in the depth map obtained from the depth-by stereo method. These holes are due to the failure of the initial depth-by-stereo method due to occlusion: areas which are visible on one camera but occluded in the other camera used for depth-by-stereo (this results in missing depth values). The invention also proposes a system for training a model to be used for semantic segmentation of images, comprising:

a module A for obtaining a first plurality of foggy images having different densities of synthetic fog, a module B for training a classification model for estimating fog density using the first plurality of foggy images and the associated different densities, a module C for classifying a second plurality of images using the classification model of module B according to the fog density in the images, so as to obtain a second plurality of foggy images each having a fog density comprised within a first fog density threshold and a second fog density threshold, a module D for obtaining a third plurality of foggy images each having a fog density of synthetic fog comprised within the first fog density threshold and the second fog density threshold, a module E for training a semantic segmentation model using the third plurality of foggy images and predefined semantic segmentations of the third plurality of images, a module F for applying the semantic segmentation model of step e to the second plurality of foggy images to obtain semantic segmentations of the second plurality of foggy images, a module G for obtaining a fourth plurality of foggy images each having a fog density of synthetic fog comprised within a third fog density threshold and a fourth fog density threshold, the third and fourth fog density thresholds being both greater than the first and second fog density thresholds, a module H for training the semantic segmentation model of step e using:
the fourth plurality of foggy images and predefined semantic segmentations of the fourth plurality of foggy images,
the second plurality of foggy images and the semantic segmentations of the plurality of foggy images obtained by module F.

This system may be configured to perform all the embodiments of the method as defined above.

In one particular embodiment, the steps of the above methods are determined by computer program instructions.

Consequently, the invention is also directed to a computer program for executing the steps of the methods as described above when this program is executed by a computer.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

How the present invention may be put into effect will now be described by way of example with reference to the appended drawings, in which.

DESCRIPTION OF THE EMBODIMENTS

Figure 1:
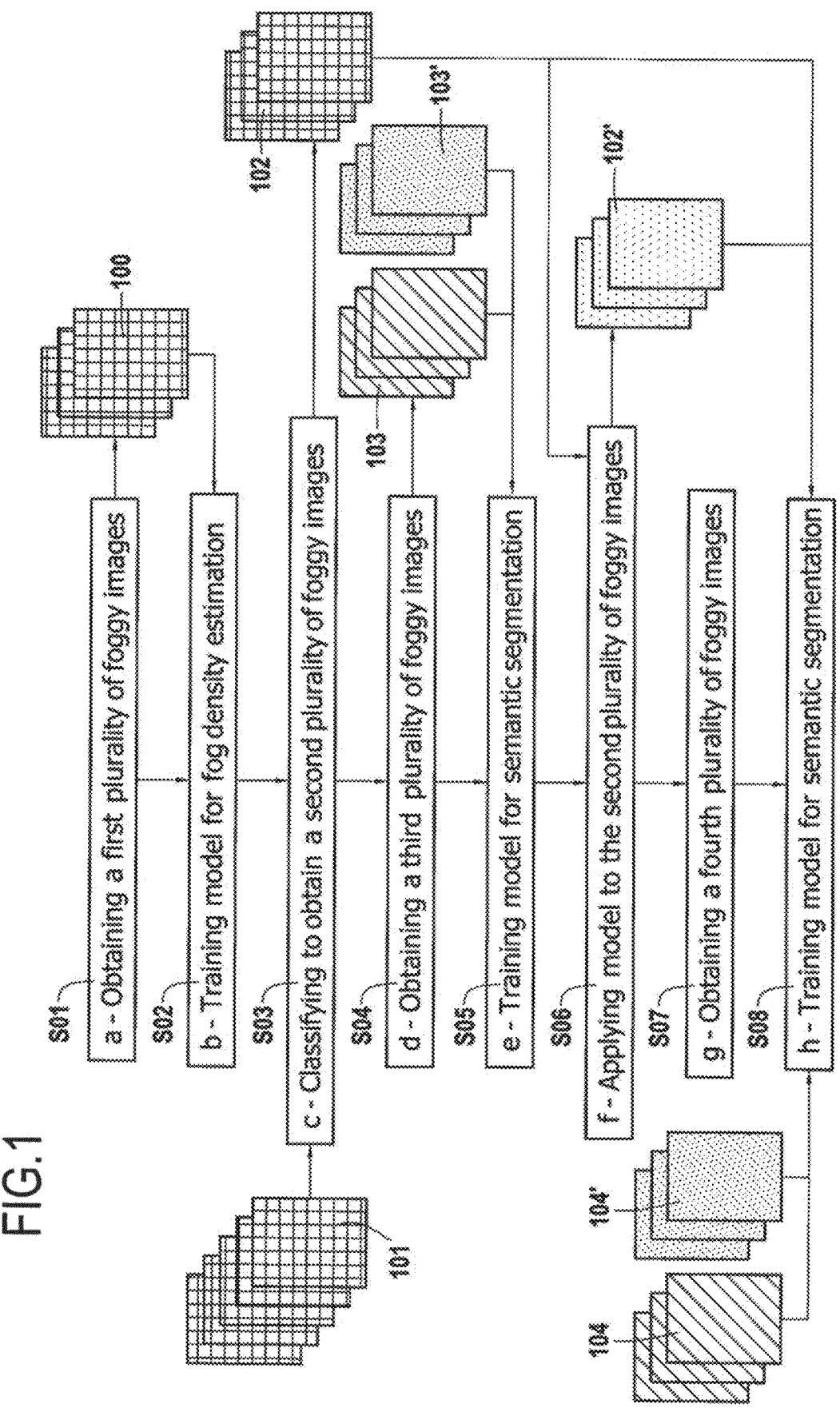
FIG. 1 is a block diagram of an exemplary method.

A method for training a model is shown on FIG. 1.

This model may be, initially, a neural network or a convolutional neural network which may have been conceived to perform semantic segmentation on images. However, initially, the model has not been trained to perform semantic segmentation on foggy images.

The images which may be processed by the model (after complete training) may be photographs taken by image sensors. A plurality of objects may be visible on these images, preferably objects of different types which may or may not overlap.

By way of example, the images show a scene which may be visible from a vehicle on a road, for example in a street.

In a first step S01, a first plurality of foggy images having different densities of synthetic fog.

This step may be performed using a plurality of images which do not have fog on them.

In order to have realistic synthetic fog on these images, the synthetic fog may be added as follows on each initial image of a plurality of initial images.

The initial image in an RGB image. In order to perform the method, a depth map has been obtained for this image. Preferentially, the depth map is obtained using a depth-by-stereo method and an outlier suppression method. In other words, two cameras may be used to acquire the image, typically a left camera and a right camera (the actual image to be processed may be the left image or the right image). On the depth map, outliers may be removed using a known method, for example the method disclosed in document "Semantic foggy scene understanding with synthetic data" (International Journal of Computer Vision, Sakaridis, C., Dai, D., Van Gool, L., 2018).

Also, in order to process the initial image, it is proposed to use a predefined semantic segmentation of the image. This semantic segmentation of the image may have been prepared by an operator annotating each portion of the image (groups of pixels) so as to indicate their type. For example, this results in a segmentation of the image which indicates whether an object is a car, a pedestrian, the road, a lane, etc.

The segmentation may be mathematically represented as a function h:

$$h: P \to \{1, \ldots, C\}$$

Wherein:

P is the discrete domain of pixel positions,

C is the total number of semantic classes (or types) in the scene (or in the image).

First, a transmittance map is elaborated. This step may comprise adding "synthetic fog" using the following equation:

$$\hat{t}(q) = \exp(-\beta l(q))$$

with:

$\hat{t}(q)$ being the transmittance of pixel q in the transmittance map, $\beta$ is an attenuation coefficient, and $l(q)$ is the depth of pixel q in the depth map.

The coefficient $\beta$ is known from the field of meteorology. In fact, the visibility of an object, also known under the acronym "MOR: Meteorological optical Range" is defined as the maximum distance from the camera (or viewpoint) for which the transmission is superior or equal to 0.05. This implies that:

$$MOR = \frac{2.996}{\beta}$$

Thus, the attenuation coefficient may be chosen superior or equal to $2.996 \times 10^{-3}$ m$^{-1}$, this value corresponding to light fog.

It has been observed by the inventors that the transmittance map, at this stage, is not satisfactory. A further filtering step is performed.

In this step, the semantic segmentation of the image is taken into account. For example, filtering the transmittance map may comprise using a bilateral filter.

This may be implemented using the following equation:

$$t(p) = \frac{\sum_{q \in N(p)} G_{\sigma_s}(\|q-p\|)[\delta(h(q)-h(p)) + \mu G_{\sigma_c}(\|J(q)-J(p)\|)]\hat{t}(q)}{\sum_{q \in N(p)} G_{\sigma_s}(\|q-p\|)[\delta(h(q)-h(p)) + \mu G_{\sigma_c}(\|J(q)-J(p)\|)]}$$

wherein:

p and q are pixels of the image,

N(p) is the neighborhood of p, t(p) is the transmittance of pixel p in the filtered transmittance map, $\hat{t}(q)$ is the transmittance of pixel q in the transmittance map, $G_{\sigma_s}$ is a spatial Gaussian kernel, $G_{\sigma_c}$ is a color-domain Gaussian kernel, $\delta$ is the Kronecker delta, $\mu$ is a predetermined weight, h(p) and h(q) are respectively the semantic labels of pixels p and q, and J(q) and J(p) are respectively the color value in the CIELAB domain.

Typical values for the parameters may be:

$\sigma_s = 20$ $\sigma_c = 10$ $\mu = 5$

Simulating fog on the image is then carried out. This simulation of the appearance of fog on the image using the filtered transmittance map comprises calculating the color value I(x) of each pixel as:

$$I(x) = R(x) + L(1-t(x))$$

wherein:
x is a pixel position,
R(x) is the color value of the image,
L(1−t(x)) is the atmospheric light, and
t(x) is the transmittance of pixel x in the filtered transmittance map.

It should be noted that R(x) is a value which has three components in the Red-Green-Blue space, each value being an integer comprised between 0 and 255.

Preferably, the atmospheric light is considered to be constant, for example the atmospheric light is a constant value estimated from the image. For example, the pixels with highest intensity values can be taken as the atmospheric light.

The image I(x) is also expressed in the Red-Green-Blue space and it is to being called a foggy image.

Thus, a first plurality of foggy images 100 may be obtained. By using various values for the coefficient β, for example a random value above $2.996 \times 10^{-3}$ m$^{-1}$, various densities of synthetic fog are visible on the images.

The first plurality of foggy images 100 is used to train a model for estimated fog density in step S02. This model is configured to receive as input an image, and to output a value (for example a coefficient β) associated with the image.

Because the values of the coefficient β of the images of the first plurality of foggy images are known, it is possible to train the network by minimizing the difference between the output of the model and the value of the coefficient β used to generate the synthetic fog.

In step S03, a second plurality of images 101 is classified using the model trained in step S02.

Preferably, the second plurality of images 101 comprises images which comprise real fog. In other words, these images are photographs taken outside on which real fog may be present at different densities of fog.

Prior to performing this classification, a first fog density threshold and a second fog density threshold have been defined so that an image which shows a light fog density is comprised within the first fog density threshold and the second fog density threshold.

The person skilled in the art will be able to determine these thresholds on the output of the model of step S02.

Using this model and the two thresholds, it is possible to select only the images of the second plurality of images 101 which have a fog density comprised within the first fog density threshold and the second fog density threshold to obtain a second plurality of foggy images 102.

Then, step S04 may be carried out in which a third plurality of foggy images 103 is obtained. This third plurality may be obtained using the same method used in step S01. The fog densities of the images of the third plurality of foggy image are chosen so as to be contained within the first fog density threshold and the second fog density threshold. Hence, in the third plurality of foggy images, the image present light fog.

On the figure, the semantic segmentations 103' of each image in the third plurality of foggy image have also been represented. This segmentation is predefined and may have been obtained before in an annotation step by an operator.

The third plurality of foggy images 103 and the corresponding predefined semantic segmentation is then used in step S05 in which a semantic segmentation model is trained.

This training is performed by inputting each image of the third plurality of foggy images 103 to the model, and comparing the output of the model to the predefined semantic segmentation of the image so as to adjust the parameters of the model and train the model.

Then, the second plurality of foggy images 102 can be inputted to the trained model of step S05 in step S06. For each image, a semantic segmentation 102' is obtained.

In step S07, a fourth plurality of foggy images 104 is obtained.

This fourth plurality may be obtained using the same method used in step S01. The fog densities of the images of the fourth plurality of foggy image are chosen so as to be contained within a third fog density threshold and a fourth fog density threshold, the third and fourth fog density thresholds being both greater than the first and second fog density thresholds.

The third and fourth fog density thresholds may be chosen so as to illustrate dense fog.

On the figure, the semantic segmentations 104' of the fourth plurality of foggy images have been represented. These semantic segmentations may have been used for the generation of synthetic fog. In the final step S08, the model trained (or pre-trained) in step S05 is trained (or trained further) using:

the fourth plurality of foggy images 104 and predefined semantic segmentations 104' of the fourth plurality of foggy images, the second plurality of foggy images 102 and the semantic segmentations 102' of the plurality of foggy images obtained in step S06.

Step S08 comprises inputting, to the semantic segmentation model of step S05, a mix of images from the second plurality of foggy images 102 and of images from the fourth plurality 104 of foggy images so as to obtain a stream of images to be fed to the model, wherein the stream of images comprises a greater proportion of images from the fourth plurality of foggy images than images from the second plurality of foggy images.

According to a particular embodiment, step h comprises minimizing the following value:

$$\frac{1}{l}\sum_{i=1}^{l} L(\phi''(x_i''), y_i) + \lambda \frac{1}{u}\sum_{j=l+1}^{l+u} L(\phi''(\bar{x}_j'), \bar{y}_j)$$

wherein:
l is the number of image in the fourth plurality of foggy images, $x_i''$ is an image of index i in the fourth plurality of foggy images, $y_i$ is the predefined semantic segmentation of image $x_i''$,
L(x, y) is the cross entropy loss function of x and y,
$\phi''(x_i'')$ is the output of the semantic segmentation model,
u is the number of images in the second plurality of foggy images, $$\lambda = \frac{u}{l} \times w,$$

with w being a predefined weight (for example equal to ⅓),
$\bar{x}_j'$ is an image of the second plurality of foggy images, and
$\bar{y}_j$ is the semantic segmentation of $x_i''$ obtained in step f.

It should be noted that semantic segmentation is easier to perform on images which have light fog rather than dense fog. Hence models trained on synthetic data (for example synthetic fog) can be generalized to real data if both data sources contain light fog rather than dense fog.

Also, dense synthetic fog and light real fog reflect different and complementary characteristics: on the one hand dense synthetic fog features similar visibility obstruction as real dense fog, but may include artifacts; light real fog, on the other hand, captures the true non uniform and spatially varying structure of fog, but at a different density.

Hence, it is proposed to use both for training the model.

Figure 2:
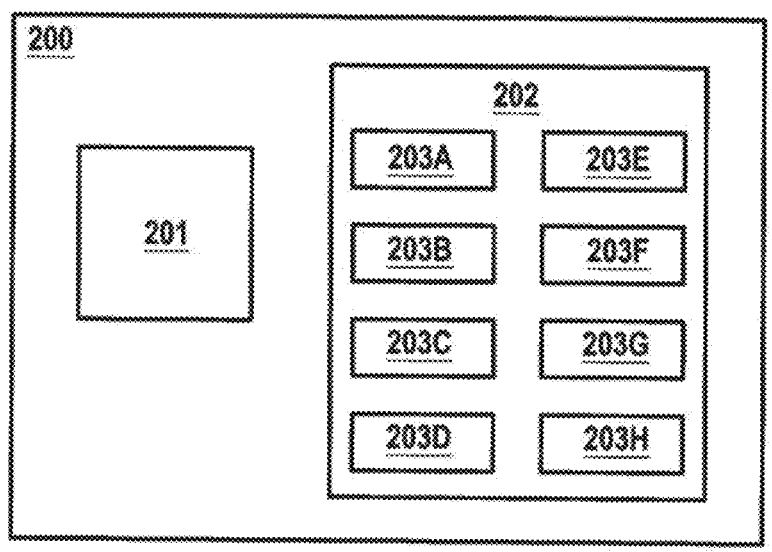
FIG. 2 is a schematic diagram of an exemplary system.

The steps of the method described in reference to FIG. 1 can be determined by computer program instructions. These instructions can be executed by a processor of a system, as represented on FIG. 2.

On this figure, a system 200 for training a model has been represented. This system 200, which may be a computer, comprises a processor 201 and a non-volatile memory 202.

In the non-volatile memory 202, a set of instructions is stored and this set of instructions comprises instructions to perform a method for training a model and more precisely:

An instruction 203A to obtain a first plurality of foggy images having different densities of synthetic fog, An instruction 203B to train a classification model for estimating fog density using the first plurality of foggy images and the associated different densities, An instruction 203C to classify a second plurality of images using the classification model of instruction 203B according to the fog density in the images, so as to obtain a second plurality of foggy images each having a fog density comprised within a first fog density threshold and a second fog density threshold, An instruction 203D to obtain a third plurality of foggy images each having a fog density of synthetic fog comprised within the first fog density threshold and the second fog density threshold, An instruction 203E to train a semantic segmentation model using the third plurality of foggy images and predefined semantic segmentations of the third plurality of images, An instruction 203F to apply the semantic segmentation model of instruction 203E to the second plurality of foggy images to obtain semantic segmentations of the second plurality of foggy images, An instruction 203G to obtain a fourth plurality of foggy images each having a fog density of synthetic fog comprised within a third fog density threshold and a fourth fog density threshold, the third and fourth fog density thresholds being both greater than the first and second fog density thresholds, An instruction 203H to train the semantic segmentation model of instruction 203E using:
the fourth plurality of foggy images and predefined semantic segmentations of the fourth plurality of foggy images,
the second plurality of foggy images and the semantic segmentations of the plurality of foggy images obtained in instruction 203F.

The instructions 203A to 203H, and the processor 201, respectively form eight modules:
a module A for obtaining a first plurality of foggy images having different densities of synthetic fog,
a module B for training a classification model for estimating fog density using the first plurality of foggy images and the associated different densities,
a module C for classifying a second plurality of images using the classification model of module B according to the fog density in the images, so as to obtain a second plurality of foggy images each having a fog density comprised within a first fog density threshold and a second fog density threshold,
a module D for obtaining a third plurality of foggy images each having a fog density of synthetic fog comprised within the first fog density threshold and the second fog density threshold,
a module E for training a semantic segmentation model using the third plurality of foggy images and predefined semantic segmentations of the third plurality of images,
a module F for applying the semantic segmentation model of step e to the second plurality of foggy images to obtain semantic segmentations of the second plurality of foggy images,
a module G for obtaining a fourth plurality of foggy images each having a fog density of synthetic fog comprised within a third fog density threshold and a fourth fog density threshold, the third and fourth fog density thresholds being both greater than the first and second fog density thresholds,
a module H for training the semantic segmentation model of step e using:
the fourth plurality of foggy images and predefined semantic segmentations of the fourth plurality of foggy images,
the second plurality of foggy images and the semantic segmentations of the plurality of foggy images obtained by module F.

It should be noted that obtaining foggy images having synthetic fog may be performed by using the method disclosed in the international patent application filed by the same applicants on the same day as the present application and titled "A method and a system for processing images to obtain foggy images", which is incorporated entirely to the present application.

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:
1. A method for training a model to be used for semantic segmentation of images, comprising:
a—obtaining a first plurality of foggy images having different densities of synthetic fog, b—training a classification model for estimating fog density using the first plurality of foggy images and the associated different densities, c—classifying a second plurality of images using the classification model of step b according to the fog density in the images, so as to obtain a second plurality of foggy images each having a fog density comprised within a first fog density threshold and a second fog density threshold, d—obtaining a third plurality of foggy images each having a fog density of synthetic fog comprised within the first fog density threshold and the second fog density threshold, e—training a semantic segmentation model using the third plurality of foggy images and predefined semantic segmentations of the third plurality of images, f—applying the semantic segmentation model of step e to the second plurality of foggy images to obtain semantic segmentations of the second plurality of foggy images, g—obtaining a fourth plurality of foggy images each having a fog density of synthetic fog comprised within a third fog density threshold and a fourth fog density threshold, the third and fourth fog density thresholds being both greater than the first and second fog density thresholds, h—training the semantic segmentation model of step e using:
the fourth plurality of foggy images and predefined semantic segmentations of the fourth plurality of foggy images,
the second plurality of foggy images and the semantic segmentations of the plurality of foggy images obtained in step f.

2. The method of claim 1, wherein step h comprises inputting, to the semantic segmentation model of step e, a mix of images from the second plurality of foggy images and of images from the fourth plurality of foggy images so as to obtain a stream of images to be fed to the model, wherein the stream of images comprises a greater proportion of images from the fourth plurality of foggy images than images from the second plurality of foggy images.

3. The method of claim 1, wherein step h comprises minimizing the following value:

$$\frac{1}{l}\sum_{i=1}^{l} L(\phi''(x_i''), y_i) + \lambda \frac{1}{u}\sum_{j=l+1}^{l+u} L(\phi''(\bar{x}_j'), \bar{y}_j)$$

wherein:
l is the number of image in the fourth plurality of foggy images,
$x_i''$ is an image of index i in the fourth plurality of foggy images,
$y_i$ is the predefined semantic segmentation of image $x_i''$,
L(x, y) is the cross entropy loss function of x and y,
$\phi''(x_i'')$ is the output of the semantic segmentation model,
u is the number of images in the second plurality of foggy images, $$\lambda = \frac{u}{l} \times w,$$

with w being a predefined weight,
$\bar{x}_j'$ is an image of the second plurality of foggy images, and
$\bar{y}_j$ is the semantic segmentation of image $x_i''$ obtained in step f.

4. The method according to claim 1, wherein in steps a, d, and g, obtaining a foggy image for the first, third or fourth plurality of foggy images comprises:
obtaining a depth map of an initial image,
obtaining a predefined semantic segmentation of the initial image,
elaborating a transmittance map of the initial image, in which for each pixel of the initial image, the transmittance decreases when the depth of the pixel in the depth map increases,
filtering the transmittance map by taking into account the predefined semantic segmentation of the image to obtain a filtered transmittance map,
simulating the appearance of fog on the initial image using the filtered transmittance map to obtain the foggy image.

5. The method according to claim 4, wherein filtering the transmittance map comprises applying a bilateral filter.

6. The method according to claim 5, wherein the bilateral filter is defined as:

$$t(p) = \frac{\sum_{q \in N(p)} G_{\sigma_s}(\|q-p\|)[\delta(h(q)-h(p)) + \mu G_{\sigma_c}(\|J(q)-J(p)\|)]\hat{t}(q)}{\sum_{q \in N(p)} G_{\sigma_s}(\|q-p\|)[\delta(h(q)-h(p)) + \mu G_{\sigma_c}(\|J(q)-J(p)\|)]}$$

wherein:
p and q are pixels of the initial image,
N(p) is the neighborhood of p,
t(p) is the transmittance of pixel p in the filtered transmittance map,
$\hat{t}(q)$ is the transmittance of pixel q in the transmittance map,
$G_{\sigma_s}$ is a spatial Gaussian kernel,
$G_{\sigma_c}$ is a color-domain Gaussian kernel,
δ is the Kronecker delta,
μ is a predetermined weight,
h(p) and h(q) are respectively the semantic labels of pixels p and q, and
J(q) and J(p) are respectively the color value in the CIELAB domain.

7. The method of claim 4, wherein the transmittance map is defined as:

$$\hat{t}(q) = \exp(-\beta l(q))$$

with:
$\hat{t}(q)$ being the transmittance of pixel q in the transmittance map,
β is an attenuation coefficient, and
l(q) is the depth of pixel q in the depth map.

8. The method of claim 4, wherein simulating the appearance of fog on the initial image using the filtered transmittance map comprises calculating the color value I(x) of each pixel as:

$$I(x) = R(x) + L(1-t(x))$$

wherein:

x is a pixel position,

R(x) is the color value of the image,

L(1−t(x)) is the atmospheric light, and t(x) is the transmittance of pixel x in the filtered transmittance map.

9. The method according to claim 4, wherein the depth map is obtained using a depth-by-stereo method and an outlier suppression method.

10. A semantic segmentation method comprising using the model of step h of claim 1 on an image.

11. A system for training a model to be used for semantic segmentation of images, comprising:
- a module A for obtaining a first plurality of foggy images having different densities of synthetic fog,
- a module B for training a classification model for estimating fog density using the first plurality of foggy images and the associated different densities,
- a module C for classifying a second plurality of images using the classification model of module B according to the fog density in the images, so as to obtain a second plurality of foggy images each having a fog density comprised within a first fog density threshold and a second fog density threshold,
- a module D for obtaining a third plurality of foggy images each having a fog density of synthetic fog comprised within the first fog density threshold and the second fog density threshold,
- a module E for training a semantic segmentation model using the third plurality of foggy images and predefined semantic segmentations of the third plurality of images,
- a module F for applying the semantic segmentation model trained by module E to the second plurality of foggy images to obtain semantic segmentations of the second plurality of foggy images,
- a module G for obtaining a fourth plurality of foggy images each having a fog density of synthetic fog comprised within a third fog density threshold and a fourth fog density threshold, the third and fourth fog density thresholds being both greater than the first and second fog density thresholds,
- a module H for training the semantic segmentation model trained by module E using:
- the fourth plurality of foggy images and predefined semantic segmentations of the fourth plurality of foggy images,
- the second plurality of foggy images and the semantic segmentations of the plurality of foggy images obtained by module F.

12. A non-transitory computer readable medium storing a computer program including instructions for executing the steps of a method according to claim 1 when said program is executed by a computer.

* * * * *